9602X
J. C. Conklin.
Revolving Harrow.
Patented Apr. 21, 1836.
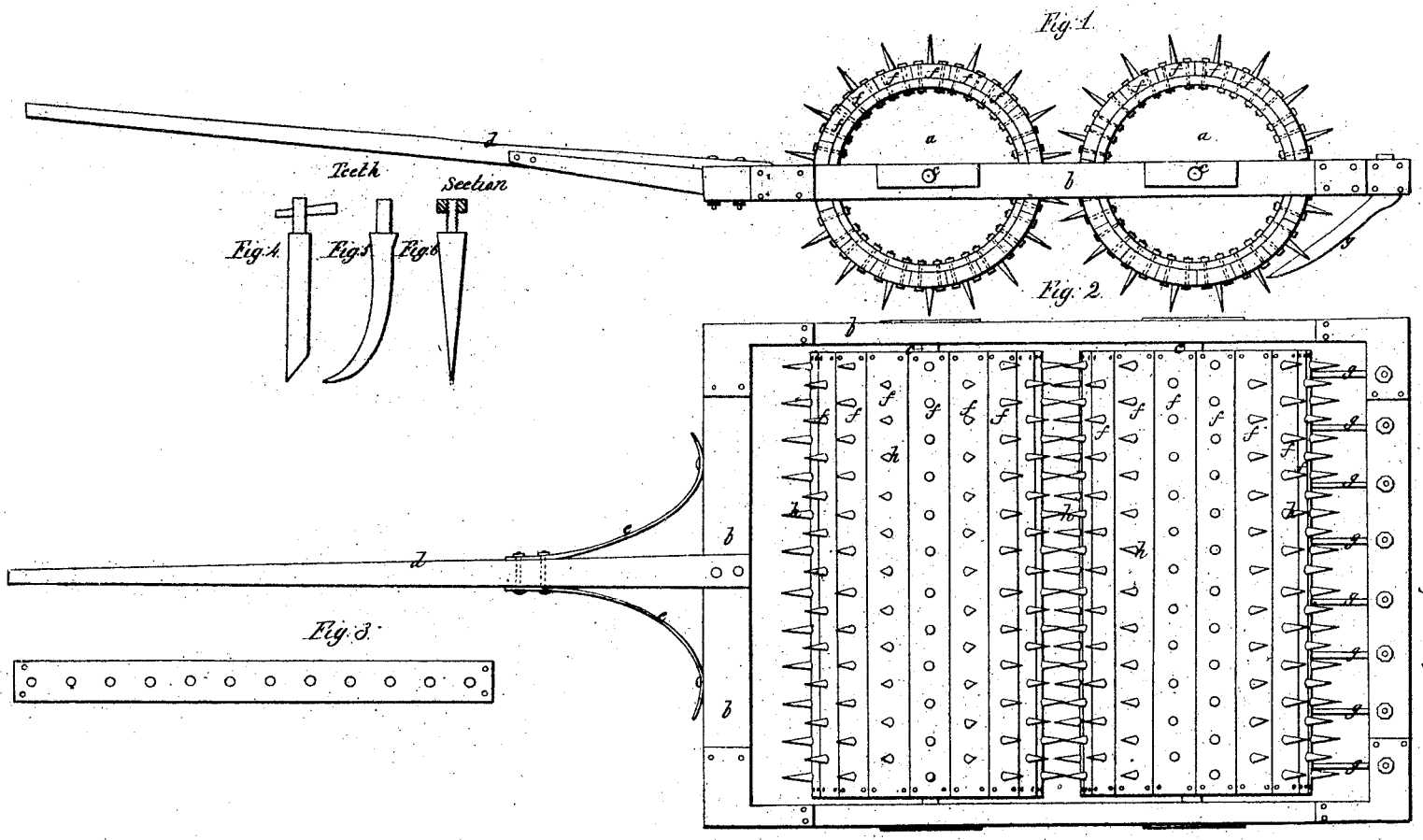

9602X

UNITED STATES PATENT OFFICE.

JOHN C. CONCKLIN, OF PEEKSKILL, NEW YORK.

IMPROVEMENT IN HARROWS.

Specification forming part of Letters Patent dated April 21, 1836.

*To all whom it may concern:*

Be it known that I, JOHN C. CONCKLIN, of Peekskill, in the county of Westchester and State of New York, have invented a new and useful Improvement in a Revolving Press-Harrow for the Purpose of Improving Sward and Arable Land; and I do hereby declare that the following is a full and exact description of the construction and operation of the said machine or improvement as invented or improved by me.

Two cylinders are made of cast metal or other substance, of any required length or diameter, and are formed of staves, which are bolted to end pieces or heads, in the center of which are holes or boxes for the purpose of revolving on an axle which passes through the center of each cylinder. The two cylinders are placed on the axle in a straight line, the two inner ends coming nearly in contact with each other. A wooden frame is then made which encircles the whole and framed to the axle at each end. To the center of the frame in front the tongue is placed and made sufficiently strong by means of braces. Iron braces also pass from the tongue between the two cylinders, over and under the axle, (being bolted to it,) and reaching to the frame behind. In the surface of the cylinders holes are made to receive teeth, four inches apart, or more or less, as required. The teeth are made of wrought-iron, or other metal or wood, of any convenient size, so that by the revolving of the cylinders or rollers upon sward or other land the surface will be sufficiently scarified, cut, or loosened to answer the required purpose. The teeth are made straight on one side and beveled on the other, so that they will enter the ground perpendicularly, or nearly so, and perform the business of cutting or loosening the sward or earth after the rollers have passed. They can, however, be made hooked or perfectly straight, as may best suit the particular purpose of the farmer, and are fastened to the cylinders or rollers by means of keys or nuts upon the inside. The teeth may be removed when a smooth roller only is required by taking off one or more of the staves. The teeth are set in rows lengthwise of the cylinders or rollers, so that the teeth of one row will stand opposite of the spaces in the next; or, in other words, so that each tooth will stand opposite to a space in the next row, dividing the distance. On the under side of the frame that passes directly behind the cylinders teeth are also placed, made of wood or iron, of such length or shape as may be required, extending downward, with the points coming nearly in contact with the cylinders or rollers, and passing between the row of teeth on the same, by means of which all turf, stones, clay, or other incumbrances which might clog the rollers are removed.

This axle should generally be made of wood in one piece turned in a lathe and left largest in the middle.

The applicant describes the principle of his improvement for which he claims his patent, as follows: It consists of a combination of two rollers, constructed substantially as above described, having rows of teeth shaped and set and easily removed, substantially as aforesaid, the said rollers being set in a frame, as aforesaid, to which is attached a rake or cleaner, substantially as aforesaid, the cylinders being of any convenient length and diameter, and the frame and cleaner constructed in proportion to the rollers.

JOHN C. CONCKLIN.

Witnesses:
JAMES H. CONCKLIN,
JAMES TAYLOR.